(12) United States Patent
Rong et al.

(10) Patent No.: US 9,485,648 B2
(45) Date of Patent: Nov. 1, 2016

(54) METHOD FOR DISTRIBUTING VIRTUAL USER IDENTIFICATION DATA, METHOD FOR ACQUIRING VIRTUAL USER IDENTIFICATION DATA, AND DEVICE

(71) Applicant: Huawei Technologies Co., Ltd., Shenzhen (CN)

(72) Inventors: Guoqiang Rong, Shenzhen (CN); Zijun Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 17 days.

(21) Appl. No.: 14/539,755

(22) Filed: Nov. 12, 2014

(65) Prior Publication Data

US 2015/0072616 A1    Mar. 12, 2015

Related U.S. Application Data

(63) Continuation of application No. PCT/CN2014/076303, filed on Apr. 26, 2014.

(30) Foreign Application Priority Data

Jun. 5, 2013 (CN) .......................... 2013 1 0221077

(51) Int. Cl.
*H04B 5/00* (2006.01)
*H04W 8/20* (2009.01)
(Continued)

(52) U.S. Cl.
CPC ........... *H04W 8/205* (2013.01); *H04B 5/0031* (2013.01); *H04W 8/183* (2013.01); *H04W 8/265* (2013.01); *H04W 4/008* (2013.01)

(58) Field of Classification Search
CPC . H04W 8/205; H04W 5/0031; H04W 8/183; H04W 8/265; H04W 4/008
USPC .......................................................... 455/41.1
See application file for complete search history.

(56) References Cited

U.S. PATENT DOCUMENTS 8,639,629 B1 * 1/2014 Hoffman ................ G06Q 20/20
                                                              705/44
2005/0065950 A1 * 3/2005 Chaganti ................ H04L 29/06
(Continued)

FOREIGN PATENT DOCUMENTS

CN    101222723 A    7/2008
CN    101400180 A    4/2009
(Continued)

OTHER PUBLICATIONS

Kasper, M., et al., "Subscriber Authentication in Cellular Networks with Trusted Virtual SIMs," 10th International Conference on Advanced Communication Technology, ICACT 2008, vol. 2, Feb. 17-20, 2008, pp. 903-908.

*Primary Examiner* — April G Gonzales
(74) *Attorney, Agent, or Firm* — Slater Matsil, LLP

(57) ABSTRACT

A distribution method is disclosed. A distribution device receives based on a near field communication protocol, a virtual user identification data acquiring request sent by a terminal device. The virtual user identification data acquiring request carries service selection information of virtual user identification data that needs to be acquired. According to the service selection information, subscription relationship data of virtual user identification data matching the service selection information is determined. The distribution device sends the subscription relationship data to the terminal device based on the near field communication protocol.

20 Claims, 8 Drawing Sheets

(51) Int. Cl.
*H04W 8/18* (2009.01)
*H04W 8/26* (2009.01)
*H04W 4/00* (2009.01)

(56) References Cited

U.S. PATENT DOCUMENTS

| | | | | |
|---|---|---|---|---|
| 2005/0266883 | A1* | 12/2005 | Chatrath | H04B 1/3816 455/558 |
| 2006/0133392 | A1* | 6/2006 | Ajitomi | H04L 12/2803 370/401 |
| 2010/0192212 | A1* | 7/2010 | Raleigh | G06Q 10/06375 726/7 |
| 2010/0311468 | A1* | 12/2010 | Shi | H04W 4/003 455/558 |
| 2011/0306318 | A1* | 12/2011 | Rodgers | H04W 8/183 455/410 |
| 2012/0047227 | A1* | 2/2012 | Haggerty | G06Q 30/06 709/217 |
| 2012/0123945 | A1* | 5/2012 | Charrat | G06Q 20/204 705/50 |
| 2012/0149302 | A1* | 6/2012 | Sekiya | G06Q 20/3278 455/41.1 |
| 2012/0196569 | A1* | 8/2012 | Holtmanns | H04L 63/0428 455/411 |

FOREIGN PATENT DOCUMENTS

| | | |
|---|---|---|
| CN | 102461228 A | 5/2012 |
| CN | 102870443 A | 1/2013 |
| CN | 103347257 A | 10/2013 |
| EP | 2701414 A1 | 2/2014 |
| WO | 2012104477 A1 | 8/2012 |
| WO | 2014170545 A1 | 10/2014 |

* cited by examiner

METHOD FOR DISTRIBUTING VIRTUAL USER IDENTIFICATION DATA, METHOD FOR ACQUIRING VIRTUAL USER IDENTIFICATION DATA, AND DEVICE

This application is a continuation of International Application No. PCT/CN2014/076303, filed on Apr. 26, 2014, which claims priority to Chinese Patent Application No. 201310221077.7, filed on Jun. 5, 2013, both of which are hereby incorporated by reference in their entireties.

TECHNICAL FIELD

The present invention relates to the field of communications technologies and, in particular embodiments, to a method for distributing virtual user identification data, a method for acquiring virtual user identification data, and a device.

BACKGROUND

In wireless communication, a user identity module generally needs to be deployed on a terminal. In the GSM standard, the user identity module is called a subscriber identity module SIM (Subscriber Identity Module); in the CDMA standard, the user identity module is called a user identity module UIM (User Identity Module); and in the UMTS standard, the user identity module is called a universal subscriber identity module USIM (Universal Subscriber Identity Module). Currently, the foregoing user identity module exists in a form of a physical card, and the terminal can be used only after the terminal is installed with the physical card.

With the development of technologies, virtual user identification data is further introduced, that is, a card in a physical form does not need to be inserted into a mobile phone, but data content corresponding to a user identity module (hereinafter referred to as virtual user identification data) is downloaded and stored in a secure storage area of the mobile phone, so as to achieve a same effect as a physical SIM card. In addition, the use of the virtual user identification data does not rely on a slot that is reserved for the physical SIM card during manufacturing of the mobile phone, and multiple pieces of virtual user identification data can be used in a mobile phone more conveniently. In the prior art, a mobile terminal is required to have a capability of accessing a communications network. However, under a specific condition, for example, when the mobile terminal is not within an operator service area, the mobile terminal cannot access the communications network, and therefore cannot access a remote database, so that the virtual user identification data cannot be downloaded.

SUMMARY

The present invention provides a method for distributing virtual user identification data, a method for acquiring virtual user identification data, and a device, which are used to solve a technical problem that when a user cannot access an operator network or the Internet, the user obtains, by using a terminal device, subscription relationship data of required virtual user identification data.

According to a first aspect, the present invention provides a method for distributing virtual user identification data. A distribution device stores virtual user identification data. The distribution device is connected to a terminal device by using a near field communication protocol. The distribution device receives a virtual user identification data acquiring request sent by the terminal device and based on the near field communication protocol. The virtual user identification data acquiring request carries service selection information of virtual user identification data that needs to be acquired. Subscription relationship data of virtual user identification data matching the service selection information is determined according to the service selection information. The distribution device sends the subscription relationship data to the terminal device based on the near field communication protocol.

With reference to the first aspect, in a first possible implementation manner that the virtual user identification data be stored by the distribution device, a correspondence between a classification identifier and the service selection information. The distribution device can search for classification identifier corresponding to the service selection information according to the correspondence between the classification identifier and the service selection information.

With reference to the first possible implementation manner of the first aspect, in a second possible implementation manner, the storing, by a distribution device, virtual user identification data specifically includes: storing, by the distribution device, a correspondence between the classification identifier and an available number segment; and the determining, according to the service selection information, subscription relationship data of virtual user identification data matching the service selection information specifically further includes: searching, by the distribution device, according to the correspondence between the classification identifier and the available number segment, for an available number segment corresponding to the classification identifier, and acquiring, according to the available number segment, subscription relationship data of virtual user identification data matching a distributed number.

With reference to the first possible implementation manner or the second possible implementation manner of the first aspect, in a third possible implementation manner, the storing, by a distribution device, virtual user identification data specifically further includes: storing, by the distribution device, a correspondence among the classification identifier, feature information, a management program, and a driver; and the virtual user identification data acquiring request further includes feature information of the terminal device, and the method for distributing virtual user identification data further includes: determining, by the distribution device, according to the classification identifier and the feature information of the terminal device, a management program and a driver of virtual user identification data that match software and hardware systems supported by the terminal device; and sending, by the distribution device, the management program and the driver of the virtual user identification data to the terminal device based on the near field communication protocol.

With reference to the first aspect and any one possible implementation manner of the first aspect, in a fourth possible implementation manner, the method for distributing virtual user identification data further includes updating locally stored virtual user identification data according to a distribution result.

With reference to the first aspect and any one possible implementation manner of the first aspect, in a fifth possible implementation manner, the method for distributing virtual user identification data further includes storing the subscription relationship data in a secure storage area configured with access rights in the distribution device.

According to a second aspect, the present invention provides a method for acquiring virtual user identification data. A distribution device stores virtual user identification data. The distribution device is connected to a terminal device by using a near field communication protocol. The terminal device sends, based on the near field communication protocol, a virtual user identification data acquiring request to the distribution device. The virtual user identification data acquiring request carries service selection information of virtual user identification data that needs to be acquired. Subscription relationship data that is of virtual user identification data matching the service selection information is returned by the distribution device based on the near field communication protocol.

With reference to the second aspect, in a first possible implementation manner, the virtual user identification data acquiring request further includes feature information of the terminal device, and the method for acquiring virtual user identification data further includes receiving, by the terminal device, based on the near field communication protocol, a management program and a driver that are sent by the distribution device, where the management program and the driver match software and hardware systems supported by the feature information of the terminal device.

With reference to the second aspect and the first possible implementation manner of the second aspect, in a second possible implementation manner, the method for acquiring virtual user identification data further includes executing the management program and the driver, and importing the subscription relationship data of the virtual user identification data into a secure storage area configured with access rights in the terminal device.

According to a third aspect, the present invention provides a distribution device, where the distribution device is connected to a terminal device by using a near field communication protocol. A storing unit is configured to store virtual user identification data. A receiving unit is configured to receive, based on the near field communication protocol, a virtual user identification data acquiring request sent by the terminal device. The virtual user identification data acquiring request carries service selection information of virtual user identification data that needs to be acquired. A processing unit is configured to determine, according to the service selection information, subscription relationship data of virtual user identification data matching the service selection information. A sending unit is configured to send the subscription relationship data to the terminal device based on the near field communication protocol.

With reference to the third aspect, in a first possible implementation manner, the virtual user identification data stored by the storing unit specifically includes: a correspondence between a classification identifier and the service selection information; and the processing unit is further configured to search, according to the correspondence between the classification identifier and the service selection information, for a classification identifier corresponding to the service selection information.

With reference to the first possible implementation manner of the third aspect, in a second possible implementation manner, the virtual user identification data stored by the storing unit specifically further includes: a correspondence between the classification identifier and an available number segment; and the processing unit is further configured to search, according to the correspondence between the classification identifier and the available number segment, for an available number segment corresponding to the classification identifier, and acquire, according to the available number segment, subscription relationship data of virtual user identification data matching a distributed number.

With reference to the first possible implementation manner or the second possible implementation manner of the third aspect, in a third possible implementation manner, the virtual user identification data stored by the storing unit specifically further includes: a correspondence among the classification identifier, feature information, a management program, and a driver; the virtual user identification data acquiring request further includes feature information of the terminal device; and the processing unit is further configured to determine, according to the classification identifier and the feature information of the terminal device, a management program and a driver of virtual user identification data that match software and hardware systems supported by the terminal device.

With reference to the third aspect and any one possible implementation manner of the third aspect, in a fourth possible implementation manner, the processing unit is further configured to update locally stored virtual user identification data according to a distribution result.

With reference to the third aspect and any one possible implementation manner of the third aspect, in a fifth possible implementation manner, the storing unit includes: a secure storage area configured with access rights, used to store the subscription relationship data of the virtual user identification data.

According to a fourth aspect, the present invention provides a terminal device. A distribution device stores virtual user identification data and the distribution device is connected to a terminal device by using a near field communication protocol. A sending device is configured to send, based on the near field communication protocol, a virtual user identification data acquiring request to the distribution device. The virtual user identification data acquiring request carries service selection information of virtual user identification data that needs to be acquired. A receiving unit is configured to receive subscription relationship data that is of virtual user identification data matching the service selection information and returned by the distribution device based on the near field communication protocol.

With reference to the fourth aspect, in a first possible implementation manner, the virtual user identification data acquiring request further includes feature information of the terminal device, and the sending unit is further configured to receive, based on the near field communication protocol, a management program and a driver that are sent by the distribution device, where the management program and the driver match software and hardware systems supported by the feature information of the terminal device.

With reference to the fourth aspect and the first possible implementation manner of the fourth aspect, in a second possible implementation manner, the terminal device further includes a processing unit, configured to execute the management program and the driver, and import the subscription relationship data of the virtual user identification data into a secure storage area configured with access rights in the terminal device.

In the method for distributing virtual user identification data, the method for acquiring virtual user identification data, and the device provided by the embodiments of the present invention, a distribution device can distribute virtual user identification data to a target terminal device based on a near field communication protocol, so that the terminal device can also acquire subscription relationship data of required virtual user identification data without support of a communications network, and then the terminal device activates subscription relationship data of the virtual user identification data, so as to achieve a purpose of accessing an operator network.

BRIEF DESCRIPTION OF THE DRAWINGS

The accompanying drawings included in the specification and forming one part of the specification, together with the specification, describe exemplary embodiments, features, and aspects of the present invention, and are used to explain principles of the present invention.

DETAILED DESCRIPTION OF ILLUSTRATIVE EMBODIMENTS

The following describes, with reference to the accompanying drawings, various exemplary embodiments, features, and aspects of the present invention in detail. A same mark in the accompanying drawings indicates components with a same or similar function. Though various aspects of the embodiments are shown in the accompanying drawings, unless otherwise specified, the accompanying drawings do not need to be drawn proportionally.

The dedicated term "exemplary" means "being used as an example, an embodiment or illustration". Any embodiment described as "exemplary" is not necessarily explained as being superior or better than other embodiments.

In addition, for better description of the present invention, a lot of specific details are provided in the following specific implementation manners. A person of ordinary skill in the art should understand that the present invention may also be implemented without the specific details. In some other embodiments, common methods, means, components, and circuits are not described in detail for the convenience of highlighting the major idea of the present invention.

Embodiment 1

Figure 1A:
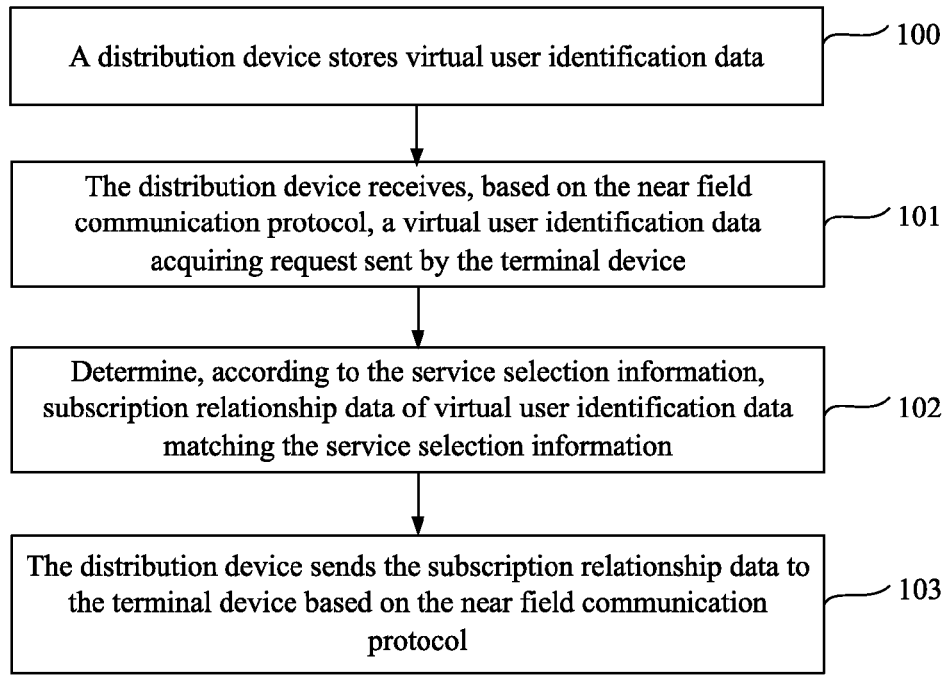
FIG. 1a is a flowchart of a method for distributing virtual user identification data according to Embodiment 1 of the present invention.

FIG. 1a is a flowchart of a method for distributing virtual user identification data according to Embodiment 1 of the present invention. As shown in FIG. 1a, the method for distributing virtual user identification data includes the following steps.

Step 100: A distribution device stores virtual user identification data, where the distribution device is connected to a terminal device by using a near field communication protocol.

Step 101: The distribution device receives, based on the near field communication protocol, a virtual user identification data acquiring request sent by the terminal device, where the virtual user identification data acquiring request carries service selection information of virtual user identification data that needs to be acquired.

Step 102: Determine, according to the service selection information, subscription relationship data of virtual user identification data matching the service selection information.

Step 103: The distribution device sends the subscription relationship data to the terminal device based on the near field communication protocol.

Figure 1B:
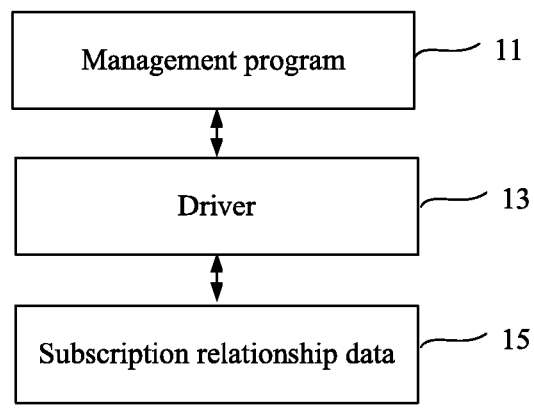
FIG. 1b is a structural diagram of virtual user identification data related content in the method for distributing virtual user identification data according to Embodiment 1 of the present invention.

The virtual user identification data includes a management program 11, a driver 13, and subscription relationship data 15. FIG. 1b is a structural diagram of virtual SIM card related content in the method for distributing virtual user identification data according to Embodiment 1 of the present invention. As shown in FIG. 1b, the subscription relationship data 15 may be accessed by using the management program 11 and the driver 13, and all functions of a physical user identity module may be implemented by using software, where the specific functions may include the following content:

(1) User Related Data

The user related data of the virtual user identification data may be classified into four types: the first type is data stored fixedly, where this type of data may be stored in an ME (mobile equipment) in advance, which includes an IMSI (international mobile subscriber identification number), a KI (key identifier), or the like; the second type is network related data stored temporarily, for example, an LAI (local area identity), a TMSI (temporary mobile subscriber identity), and a public phone network code that is forbidden to access; the third type is related service code, such as a PIN (personal identification number), a PUK PIN unlocking key), and a charging rate; and the fourth type is a phone number directory, that is, a phone number input by a user at any time.

(2) Operation and Management on a User PIN

The virtual user identification data is protected by using a PIN code, where the PIN is a personal password of four digits to eight digits. Only when the user inputs a correct PIN code can the virtual user identification data be activated and can the mobile terminal access the virtual user identification data. The user can access an operator network to perform a voice call only after the PIN passes authentication.

(3) User Identity Authentication

Whether a user identity is valid is determined. An authentication process is performed between a network and the virtual user identification data, and the authentication is generally performed at a time when the mobile terminal registers with a network and initiates a call. When the authentication starts, the network generates a 128-bit RAND (Random Number, random number); the random number is transferred to a mobile station through a radio control channel; and the management program 11 calculates an SRES (signed response) from a received RAND by using the virtual user identification data and according to a set key KI and a set algorithm A3, and returns a result to a network end. When the network end checks the key KI of the user in an authentication center, the network end calculates an SRES by using the same RAND and algorithm A3, and compares the SRES with the received SRES; and if the calculated SRES is the same as the received SRES, the authentication succeeds.

(4) Security Algorithm and Key

The most sensitive data of the virtual user identification data is security algorithms A3 and A8, a key KI, a PIN, a PUK, and a KC (Key Cipher, key cipher). The algorithms A3 and A8 are written when the virtual user identification data is generated, and cannot be read. The PIN code may be set on a mobile phone by the user, the PUK code is possessed by an operator, and the KC is exported from the KI during an encryption process.

The management program 11 and the driver 13 may implement functions of operation and management on the user PIN, user identity authentication, and the security algorithm and the key, and the subscription relationship data 15 may include user related data.

The method for distributing virtual user identification data is specifically described as follows.

The distribution device may store a large quantity of virtual user identification data in advance. If a user needs to download virtual user identification data, the user may send a virtual user identification data acquiring request to the distribution device after the user establishes a near field communication with the distribution device by using a terminal device, for example, a mobile phone, and by using a near field communication protocol, for example, Bluetooth, WiFi (wireless fidelity, wireless fidelity), WiFi-Direct (Wireless Fidelity Direct), or NFC; and after receiving the virtual user identification data acquiring request sent by the terminal device, the distribution device may determine subscription relationship data of matched virtual user identification data according to service selection information of virtual user identification data that expects to be acquired by the terminal device and is carried in the virtual user identification data acquiring request. The service selection information is equivalent to a filtering condition, and may indicate a type of a service that can be provided by the virtual user identification data that expects to be acquired by the user by using the terminal device, such as a communications network rate, an operator, a tariff, or a service area. The expectations may be selected on a human computer interaction interface by the user by using the terminal device.

After receiving the virtual user identification data acquiring request, the distribution device may search, according to the service selection information, for subscription relationship data that is of various virtual user identification data and stored in the distribution device, and send subscription relationship data of matched virtual user identification data to the terminal device.

In the method for distributing virtual user identification data provided by this embodiment, a distribution device can distribute virtual user identification data to a target terminal device based on a near field communication protocol, so that the terminal device can also acquire subscription relationship data of required virtual user identification data without support of a communications network, and then the terminal device activates the subscription relationship data of the virtual user identification data, so as to achieve a purpose of accessing an operator network.

Embodiment 2

Figure 2:
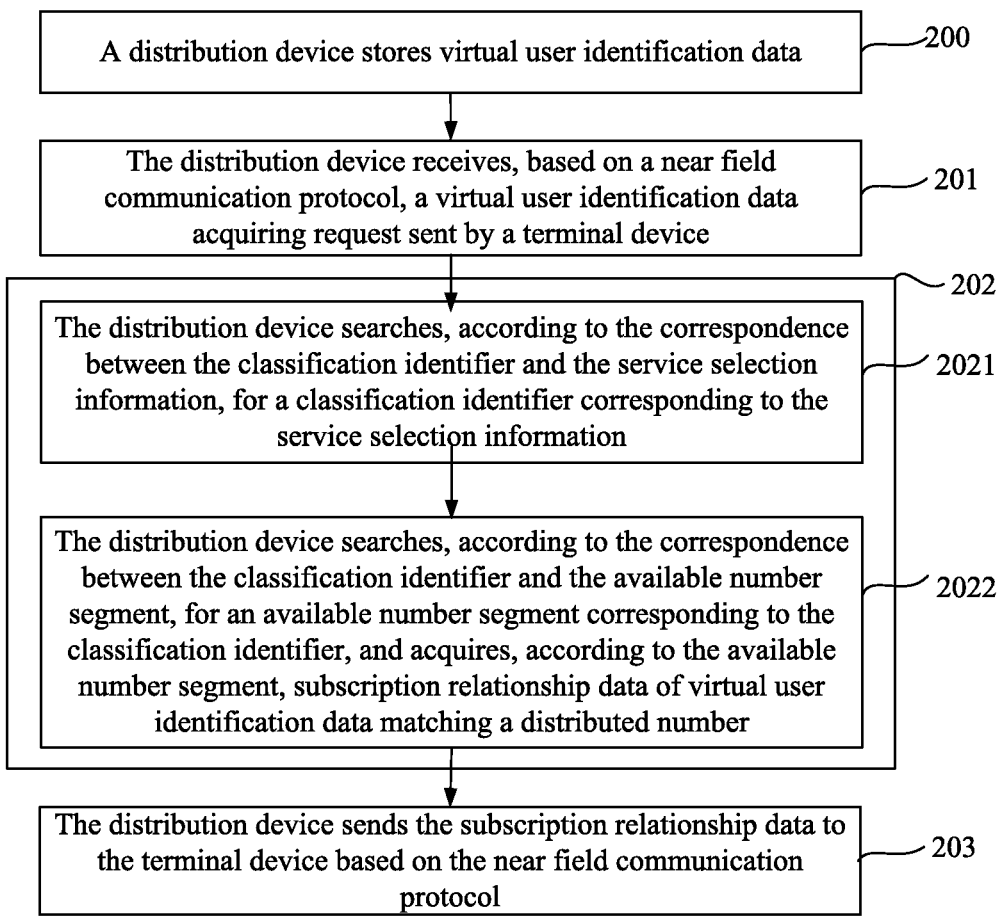
FIG. 2 is a flowchart of a method for distributing virtual user identification data according to Embodiment 2 of the present invention.

FIG. 2 is a flowchart of a method for distributing virtual user identification data according to Embodiment 2 of the present invention. As shown in FIG. 2, the method for distributing virtual user identification data includes.

Step 200: A distribution device stores virtual user identification data, which may specifically include: storing, by the distribution device, a correspondence between a classification identifier and service selection information.

Step 201: The distribution device receives, based on a near field communication protocol, a virtual user identification data acquiring request sent by a terminal device, where the virtual user identification data acquiring request carries service selection information of virtual user identification data that needs to be acquired.

Step 202: Determine, according to the service selection information, subscription relationship data of virtual user identification data matching the service selection information, which may specifically include:

Step 2021: The distribution device searches, according to the correspondence between the classification identifier and the service selection information, for a classification identifier corresponding to the service selection information. Specifically, after receiving the virtual user identification data acquiring request from the terminal device, the distribution device may search, according to the received service selection information, such as a communications network speed, an operator, a tariff, or a service area, for a classification identifier of matched virtual user identification data in a virtual user identification data product table shown in Table 1, where the classification identifier may be classified according to the operator, the tariff, and the communications network speed, and may also be classified in another manner.

TABLE 1

| VIRTUAL USER IDENTIFICATION DATA PRODUCT TABLE | | | |
|---|---|---|---|
| Classification identifier | Operator | Tariff ($/M) | Service area |
| P0001 | Vodafone | 1 | Britain and France |
| P0002 | CMCC | 1 | China |
| P0003 | CMCC | 0.5 | China |
| P0004 | Vodafone | 2 | Italy |

Further, in another embodiment of the present invention, the storing, by the distribution device, virtual user identification data specifically further includes: storing, by the distribution device, a correspondence between the classification identifier and an available number segment; and the determining, according to the service selection information, subscription relationship data of virtual user identification data matching the service selection information specifically further includes:

Step 2022: The distribution device searches, according to the correspondence between the classification identifier and the available number segment, for an available number segment corresponding to the classification identifier, and acquires, according to the available number segment, subscription relationship data of virtual user identification data matching a distributed number.

Specifically, the distribution device may search, according to the determined classification identifier and in a correspondence table between the classification identifier and the available distributed number shown in Table 2, for matched information such as an available number segment, then select an available number of matched virtual user identification data, and acquire subscription relationship data corresponding to the available number. The subscription relationship data of the virtual user identification data may be data encrypted by using a digital certificate, or the like, and may uniquely represent a subscription relationship between a user and a service provider. In a process of using the virtual user identification data in the terminal device, the virtual user identification data may be similar to a phone number in Table 2, and may also be in another representation form. Finally, the distribution device sends the subscription relationship data of the matched virtual user identification data to the terminal device by using the near field communication protocol.

TABLE 2

CORRESPONDENCE TABLE BETWEEN A CLASSIFICATION IDENTIFIER AND A AVAILABLE DISTRIBUTED NUMBER

| Classification identifier | Start number | End number |
| --- | --- | --- |
| P0001 | 186123XXXXX | 186200XXXXX |
| P0001 | 186300XXXXX | 186400XXXXX |
| P0002 | 236300XXXXX | 236400XXXXX |
| P0003 | 536300XXXXX | 536400XXXXX |
| P0004 | 636300XXXXX | 636400XXXXX |

Step 203: The distribution device sends the subscription relationship data to the terminal device based on the near field communication protocol.

In the method for distributing virtual user identification data provided by this embodiment, a distribution device can distribute virtual user identification data to a target terminal device based on a near field communication protocol, so that the terminal device can also acquire subscription relationship data of required virtual user identification data without support of a communications network, and then the terminal device activates the subscription relationship data of the virtual user identification data, so as to achieve a purpose of accessing an operator network.

Embodiment 3

Figure 3:
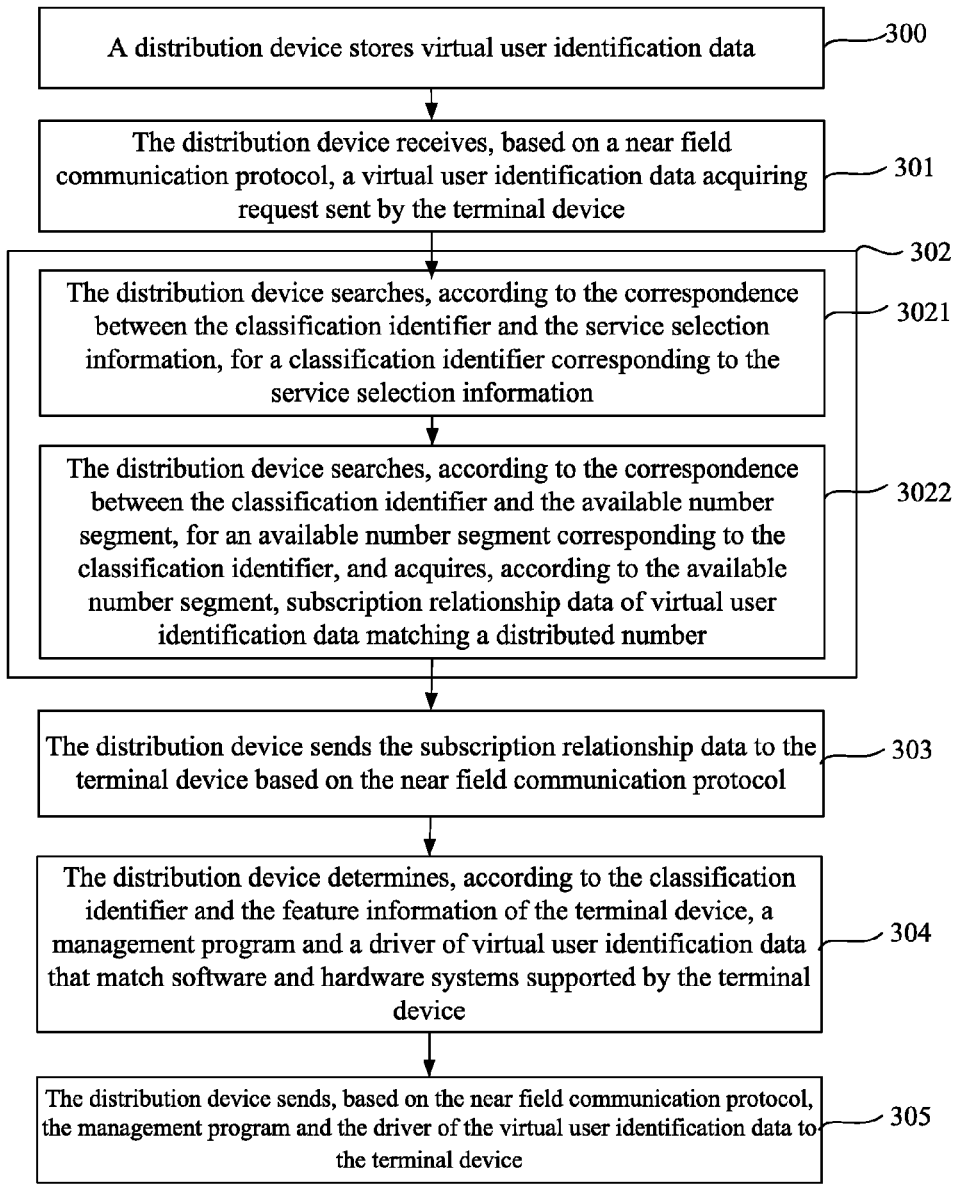
FIG. 3 is a flowchart of a method for distributing virtual user identification data according to Embodiment 3 of the present invention.

FIG. 3 is a flowchart of a method for distributing virtual user identification data according to Embodiment 3 of the present invention. As shown in FIG. 3, the virtual user identification data acquiring request includes service selection information, and may further include feature information of a terminal device. The method for distributing virtual user identification data includes the following steps.

Step 300: A distribution device stores virtual user identification data, which may specifically include: storing, by the distribution device, a correspondence between a classification identifier, feature information, a management program and a driver.

Step 301: The distribution device receives, based on a near field communication protocol, a virtual user identification data acquiring request sent by the terminal device, where the virtual user identification data acquiring request carries service selection information of virtual user identification data that needs to be acquired.

Step 302: Determine, according to the service selection information, subscription relationship data of virtual user identification data matching the service selection information. If the distribution device stores a correspondence between a classification identifier and the service selection information, step 302 may specifically include:

Step 3021: The distribution device searches, according to the correspondence between the classification identifier and the service selection information, for a classification identifier corresponding to the service selection information.

If the distribution device stores a correspondence between the classification identifier and an available number segment, step 302 may specifically further include:

Step 3022: The distribution device searches, according to the correspondence between the classification identifier and the available number segment, for an available number segment corresponding to the classification identifier, and acquires, according to the available number segment, subscription relationship data of virtual user identification data matching a distributed number.

Step 303: The distribution device sends the subscription relationship data to the terminal device based on the near field communication protocol.

Step 304: The distribution device determines, according to the classification identifier and the feature information of the terminal device, a management program and a driver of virtual user identification data that match software and hardware systems supported by the terminal device.

Step 305: The distribution device sends, based on the near field communication protocol, the management program and the driver of the virtual user identification data to the terminal device.

Step 303 may also be performed after step 304 or step 305, or step 303 and step 305 are performed simultaneously.

Management programs and drivers of various types of virtual user identification data may be installed in the terminal device in advance. The management program is used to manage subscription relationship data of virtual user identification data in a secure storage area of the terminal device. For example, when the terminal device has subscription relationship data of some virtual user identification data, the user may select, by executing the management program, subscription relationship data of virtual user identification data that expects to be used, and then access, by using a driver of the virtual user identification data, the subscription relationship data of the virtual user identification data in the secure storage area of the terminal device. The subscription relationship data is stored in the secure storage area, and the program and the driver may be stored in another area. Only an application with specific rights can access the secure storage area, for example, an application with rights to distribute a subscription relationship in the distribution device can access the secure storage area, and the terminal device and other applications cannot access the secure storage area.

If a management program and a driver of a type of virtual user identification data are not installed in the terminal device in advance, the management program and the driver may also be downloaded from the distribution device. In this case, feature information of the terminal device, such as a hardware feature and a software feature, may be carried in the virtual user identification data acquiring request. The hardware feature may include information such as whether hardware has a secure storage area, a CPU model, or a unique hardware identifier, and the software feature may include information such as a software operating system version.

Specifically, after the classification identifier is determined according to Table 1, if a management program and a driver need to be downloaded, a comparison table between a classification identifier and a management program/driver shown in Table 3 may be searched according to the software feature and the hardware feature in the feature information of the terminal device, so as to determine a management program and a driver of virtual user identification data that match software and hardware systems supported by the terminal device; then, the management program, the driver, and the subscription relationship data of the matched virtual user identification data are sent to the terminal device by using the near field communication protocol.

TABLE 3

COMPARISON TABLE BETWEEN A CLASSIFICATION IDENTIFIER AND A MANAGEMENT PROGRAM/DRIVER

| Classification identifier | Operating system version | CPU version | Driver program package | Management program package |
|---|---|---|---|---|
| P0001 | iOS 5.0 | Apple A6 | file://f:\1.dat | file://d:\1.apk |
| P0001 | Android 4.0 | Qualcomm 8 × 55 | file://f:\2.dat | file://d:\2.apk |
| P0002 | Android 3.2 | Qualcomm 7 × 27 | file://f:\3.dat | file://d:\3.apk |
| P0003 | Android 3.2 | Qualcomm 8 × 55 | file://f:\4.dat | file://d:\4.apk |
| P0004 | Android 4.2 | Qualcomm 8 × 55 | file://f:\5.dat | file://d:\5.apk |

A storage position of the subscription relationship data of the virtual user identification data in the distribution device may be an ordinary storage area, and may also be a secure storage area configured with access rights. If the subscription relationship data of the virtual user identification data is stored in the secure storage area, the subscription relationship data of the virtual user identification data that is allowed to be distributed may be more secure.

Further, after the subscription relationship data of the matched virtual user identification data is distributed to the terminal device, locally stored virtual user identification data is updated according to a distribution result, which specifically includes the following two manners:

Manner 1: Updating a state of the matched virtual user identification data that has already been distributed to the terminal device successfully. As shown in Table 4, using the virtual user identification data of which a number is 18612345678 and that has already been distributed successfully as an example, a state of the virtual user identification data is updated to "distributed completely", and may also be another description indicating that the virtual user identification data has been distributed completely and is not allowed to be distributed to another terminal device.

TABLE 4

STATE TABLE OF VIRTUAL USER IDENTIFICATION DATA

| Identity (number) of virtual user identification data | State | Hardware identifier | User identity | Balance ($) |
|---|---|---|---|---|
| 18612345678 | Distributed completely | 111XXXXX | User1 | 0 |
| 18612345679 | Used normally | 222YYYYYYY | User2 | 100 |
| 63630020000 | Insufficient balance | 236400XXXXX | User2 | 0 |
| 63630020034 | Used normally | 3456zzzzzzz | User3 | 200 |

Manner 2: Deleting subscription relationship data of the matched virtual user identification data that has already been distributed to the terminal device successfully. As shown in Table 5, for example, assuming that subscription relationship data of virtual user identification data that is allowed to be distributed is stored in a secure storage area of the distribution device, virtual user identification data of which the number is "18612345678" and that has already been distributed successfully may be deleted directly from the secure storage area of the distribution device.

TABLE 5

STATE OF VIRTUAL USER IDENTIFICATION DATA

| Identity (number) of virtual user identification data | State | Hardware identifier | User identity | Balance ($) |
|---|---|---|---|---|
| 18612345679 | Used normally | 222YYYYYYY | User2 | 100 |
| 63630020000 | Insufficient balance | 236400XXXXX | User2 | 0 |
| 63630020034 | Used normally | 3456zzzzzzz | User3 | 200 |

After Table 4 or Table 5 is updated, information of the available number segment in Table 2 may also be updated correspondingly.

Still further, after distributing the subscription relationship data of the matched virtual user identification data to the terminal device, the distribution device may further report a distribution result to a virtual user identification data server, so that the virtual user identification data server modifies a state of virtual user identification data that has already been distributed, so as to prepare for provision of an operation service.

In the method for distributing virtual user identification data provided by this embodiment, a distribution device can distribute virtual user identification data to a target terminal device based on a near field communication protocol, so that the terminal device can also acquire subscription relationship data of required virtual user identification data without support of a communications network, and then the terminal device activates the subscription relationship data of the virtual user identification data, so as to achieve a purpose of accessing an operator network.

Embodiment 4

Figure 4:
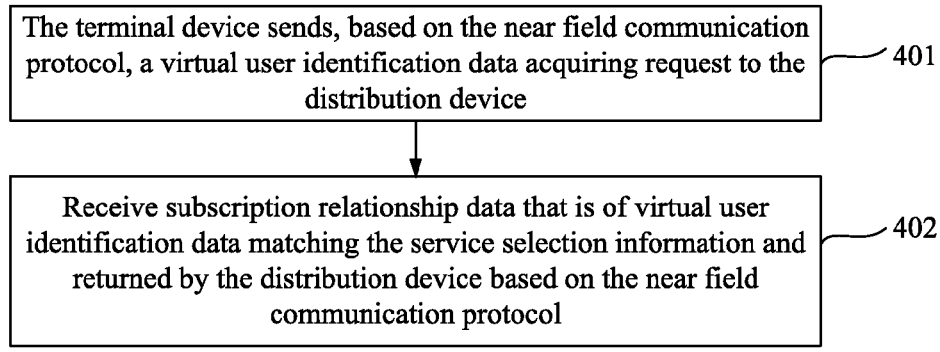
FIG. 4 is a flowchart of a method for acquiring virtual user identification data according to Embodiment 4 of the present invention.

FIG. 4 is a flowchart of a method for acquiring virtual user identification data according to Embodiment 4 of the present invention. A distribution device stores virtual user identification data, and the distribution device is connected to a terminal device by using a near field communication protocol. As shown in FIG. 4, the method for acquiring virtual user identification data may include the following steps.

Step 401: The terminal device sends, based on the near field communication protocol, a virtual user identification data acquiring request to the distribution device, where the virtual user identification data acquiring request carries service selection information of virtual user identification data that needs to be acquired.

Step 402: Receive subscription relationship data that is of virtual user identification data matching the service selection information and returned by the distribution device based on the near field communication protocol.

Specifically, when the terminal device needs to download virtual user identification data, the terminal device first establishes a near field communication with the distribution device by using a near field communication protocol, such as Bluetooth, WiFi, WiFi-Direct, or NFC, and then sends a request for requiring virtual user identification data required by the terminal device to the distribution device, where the virtual user identification data acquiring request carries service selection information of virtual user identification data that the terminal device expects to acquire; and after the distribution device determines subscription relationship data of virtual user identification data matching the service selection information, the terminal device receives the subscription relationship data of the matched virtual user identification data. For a specific method for determining the service selection information and the subscription relationship data of the virtual user identification data, reference may be made to the related descriptions in the foregoing embodiment of the method for distributing virtual user identification data.

In the method for acquiring virtual user identification data provided by this embodiment, a distribution device can distribute virtual user identification data to a target terminal device based on a near field communication protocol, so that the terminal device can also acquire subscription relationship data of required virtual user identification data without support of a communications network, and then the terminal device activates the subscription relationship data of the virtual user identification data, so as to achieve a purpose of accessing an operator network.

Embodiment 5

Figure 5:
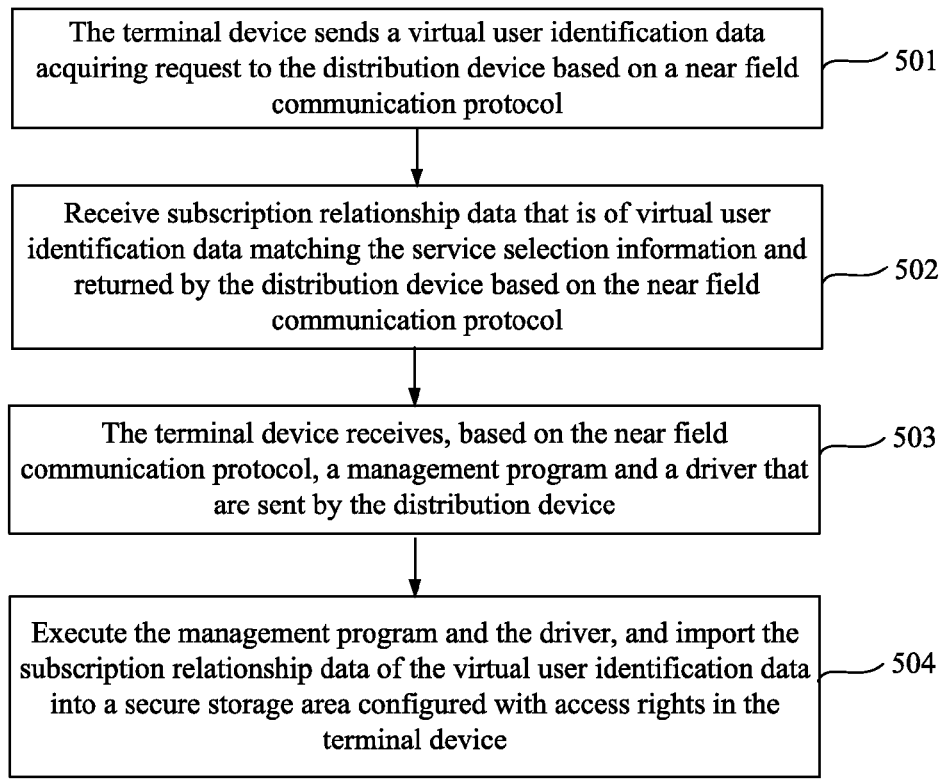
FIG. 5 is a flowchart of a method for acquiring virtual user identification data according to Embodiment 5 of the present invention.

FIG. 5 is a flowchart of a method for acquiring virtual user identification data according to Embodiment 5 of the present invention. As shown in FIG. 5, the method for acquiring virtual user identification data may include the following steps:

Step 501: The terminal device sends a virtual user identification data acquiring request to the distribution device based on a near field communication protocol, where the virtual user identification data acquiring request carries service selection information of virtual user identification data that needs to be acquired.

Step 502: Receive subscription relationship data that is of virtual user identification data matching the service selection information and returned by the distribution device based on the near field communication protocol.

Step 503: The terminal device receives, based on the near field communication protocol, a management program and a driver that are sent by the distribution device, where the management program and the driver match software and hardware systems supported by the feature information of the terminal device; and the virtual user identification data acquiring request further includes feature information of the terminal device. The distribution device may determine, according to received feature information, the management program and the driver matching the software and hardware systems supported by the terminal device.

Step 504: Execute the management program and the driver, and import the subscription relationship data of the virtual user identification data into a secure storage area configured with access rights in the terminal device.

Step 502 may also be performed after step 503 or step 504, or step 502 and step 504 are performed simultaneously.

Specifically, after the terminal device acquires the matched virtual user identification data from the distribution device by using the near field communication protocol, if a user needs to use the subscription relationship data of the virtual user identification data, the user may execute a management program and a driver of the matched virtual user identification data, where the management program and the driver match a software feature and a hardware feature that are supported by the terminal device, for example, whether there is a secure storage area, a CPU model or a unique hardware identifier, and a software operating system version, and may be installed in the terminal device in advance. If the management program and the driver of the matched virtual user identification data are not installed in advance, the terminal device needs to perform step 503, that is, the terminal device first informs, by using the virtual user identification data acquiring request, the distribution device of the feature information of the terminal device, where the feature information includes a software feature and a hardware feature, so as to acquire, from the distribution device, a management program and a driver matching the software feature and the hardware feature that are supported by the terminal device. The distribution device may search the foregoing Table 2 according to the feature information and a classification identifier, and return the management program and the driver of the matched virtual user identification data to the terminal device; and after receiving the management program and the driver, the terminal device performs step 504.

When the subscription relationship data of the virtual user identification data needs to be used, a specific method for using the management program and the driver is as follows: the management program is executed to select subscription relationship data of virtual user identification data that needs to be used; a secure storage area configured with access rights in the terminal device is accessed by using the driver, so as to operate subscription relationship data of matched virtual user identification data stored in the terminal device. In this case, the terminal device may be connected to an operator network by using the subscription relationship data of the virtual user identification data.

In the method for acquiring virtual user identification data provided by this embodiment, a distribution device can distribute virtual user identification data to a target terminal device based on a near field communication protocol, so that the terminal device can also acquire subscription relationship data of required virtual user identification data without support of a communications network, and then the terminal device activates the subscription relationship data of the virtual user identification data, so as to achieve a purpose of accessing an operator network.

Embodiment 6

Figure 6:
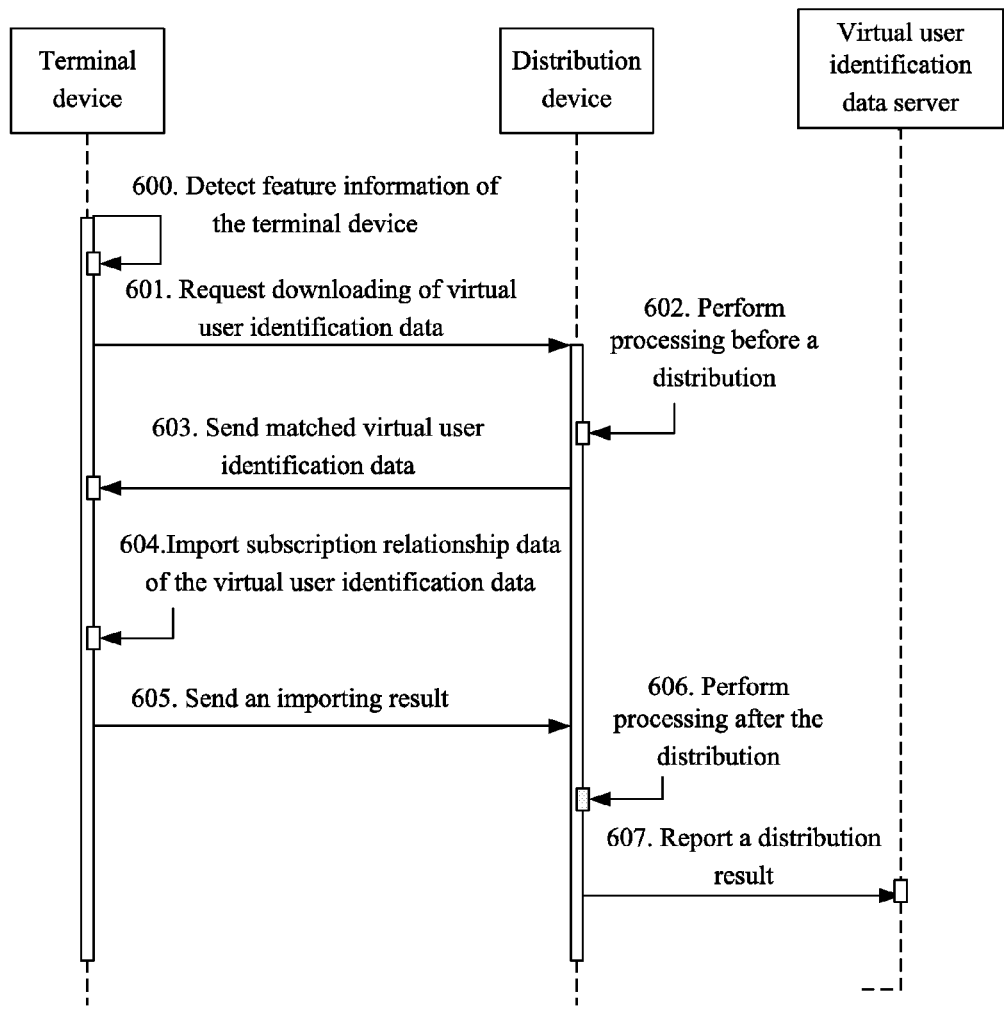
FIG. 6 is a schematic diagram of an application scenario of a method for acquiring virtual user identification data according to Embodiment 6 of the present invention.

FIG. 6 is a schematic diagram of an application scenario of a method for acquiring virtual user identification data according to Embodiment 6 of the present invention. As shown in FIG. 6, the method for acquiring virtual user identification data specifically includes the following steps:

Step 600: A terminal device detects feature information of the terminal device, where the feature information includes a hardware feature and a software feature, for example, the hardware feature includes whether there is a secure storage area, a CPU model or a unique hardware identifier, and the software feature includes an operating system version, or the like.

Step 601: The terminal device sends a virtual user identification data acquiring request to a distribution device, to request downloading of virtual user identification data. The virtual user identification data acquiring request may carry service selection information, where the service selection information is a filtering condition and refers to an expectation on a service corresponding to the virtual user identification data, for example, a high-rate, a low-tariff, and a type of a management program of the virtual user identification data. The conditions may be determined on a human computer interaction interface according to a user selection. The virtual user identification data acquiring request may also carry feature information such as the hardware feature and the software feature that are of the terminal device and detected in step 600.

Step 602: After receiving the virtual user identification data acquiring request, the distribution device determines, according to the service selection information and/or the feature information in the virtual user identification data acquiring request and content of Table 1, Table 2, and Table 3 in the foregoing embodiments, whether the distribution device can provide corresponding virtual user identification data. If the distribution device can provide the corresponding virtual user identification data, the distribution device selects one piece of available virtual user identification data from Table 2, and constructs content of a message to be returned, where the content includes: subscription relationship data, a management program, and a driver of the virtual user identification data, and the management program and the driver are optional. In step 601, the terminal device may also inform, by using the service selection information, the distribution device whether the management program and the driver of the virtual user identification data are installed in the terminal device in advance.

Step 603: The distribution device returns the requested content to the terminal device.

Step 604: The terminal device invokes a capability of an operating system of the terminal device to install the management program and the driver, and executes the management program to import the subscription relationship data of the virtual user identification data. If the management program is installed in advance in the terminal device and the driver is imported into the terminal device in advance, the terminal device needs only to import the subscription relationship data of the virtual user identification data in this step.

Step 605: The terminal device reports a processing result to the distribution device.

Step 606: The distribution device updates virtual user identification data stored in the distribution device according to the received report. The distribution device may modify a state of virtual user identification data in a state table of virtual user identification data, for example, Table 4; the distribution device may modify information of an available number segment in a correspondence table between a classification identifier and the available distributed number, for example, Table 2; and the distribution device may delete, from a state table of virtual user identification data, for example, Table 5, subscription relationship data of virtual user identification data that has already been distributed successfully.

Step 607: The distribution device reports a distribution result to a virtual user identification data server. The virtual user identification data server modifies a state of virtual user identification data that has already been distributed, so as to prepare for provision of an operation service.

In the method for acquiring virtual user identification data provided by this embodiment, a distribution device can distribute virtual user identification data to a target terminal device based on a near field communication protocol, so that the terminal device can also acquire subscription relationship data of required virtual user identification data without support of a communications network, and then the terminal device activates the subscription relationship data of the virtual user identification data, so as to achieve a purpose of accessing an operator network.

Embodiment 7

Figure 7:
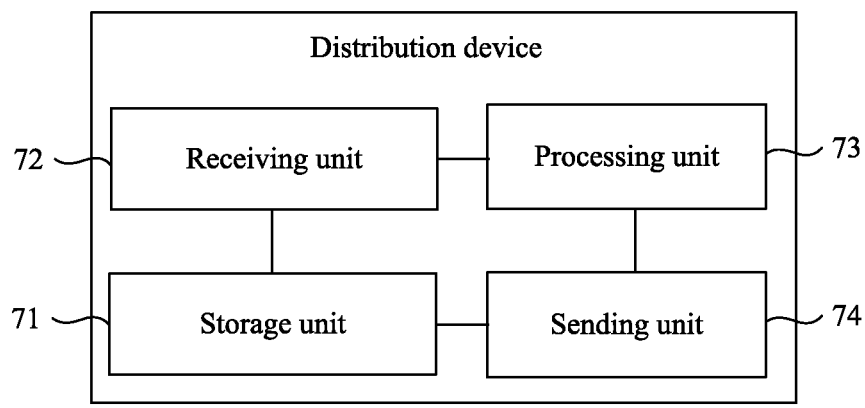
FIG. 7 is a structural block diagram of a distribution device according to Embodiment 7 of the present invention.

FIG. 7 is a structural block diagram of a distribution device according to Embodiment 7 of the present invention. The distribution device is connected to a terminal device by using a near field communication protocol. As shown in FIG. 7, the distribution device may include a number of units.

A storing unit 71 is configured to store virtual user identification data. A receiving unit 72 is configured to receive, based on the near field communication protocol, a virtual user identification data acquiring request sent by the terminal device. Virtual user identification data acquiring request carries service selection information of virtual user identification data that needs to be acquired. A processing unit 73 is configured to determine, according to the service selection information, subscription relationship data of virtual user identification data matching the service selection information. A sending unit 74 is configured to send the subscription relationship data to the terminal device based on the near field communication protocol.

In this embodiment, as shown in FIG. 1*b*, the virtual user identification data may include a management program 11, a driver 13, and subscription relationship data 15. The distribution device may access the subscription relationship data 15 by using the management program 11 and the driver 13, and may implement a function of a physical user identity module. The distribution device in this embodiment may be, for example, a mobile phone or a personal computer; the storing unit 71 of the distribution device may store a large quantity of virtual user identification data in advance. If a user needs to download virtual user identification data, the user may send a virtual user identification data acquiring request to the distribution device after the user establishes a near field communication with the distribution device by using a terminal device, for example, a mobile phone, and by using a near field communication protocol, such as Bluetooth, WiFi, wireless fidelity direct WiFi-Direct, or NFC.

After the receiving unit 72 of the distribution device receives the virtual user identification data acquiring request sent by the terminal device, the processing unit 73 may determine, according to the service selection information carried in the virtual user identification data acquiring request, subscription relationship data of virtual user identification data matching the service selection information, and the sending unit 74 may send data determined by the processing unit to the terminal device. The service selection information is equivalent to a filtering condition, and may indicate a type of a service that can be provided by the virtual user identification data that expects to be acquired by the user by using the terminal device, such as a communications network rate, an operator, a tariff, or a service area.

The expectations may be selected on a human computer interaction interface by the user by using the terminal device.

In the distribution device provided by this embodiment, a sending unit can send subscription relationship data that is of virtual user identification data and determined by a processing unit to a target terminal device based on a near field communication protocol, so that the terminal device can also acquire subscription relationship data of required virtual user identification data without support of a communications network, and then the terminal device activates the subscription relationship data of the virtual user identification data, so as to achieve a purpose of accessing an operator network.

Embodiment 8

Figure 8:
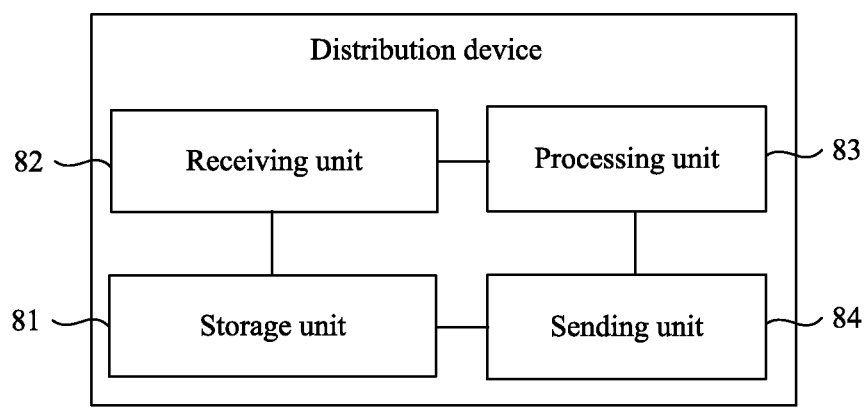
FIG. 8 is a structural block diagram of a distribution device according to Embodiment 8 of the present invention.

FIG. 8 is a structural block diagram of a distribution device according to Embodiment 8 of the present invention. The distribution device is connected to a terminal device by using a near field communication protocol. As shown in FIG. 8, the distribution device may include a number of units.

A storing unit 81 is configured to store virtual user identification data. A receiving unit 82 is configured receive, based on the near field communication protocol, a virtual user identification data acquiring request sent by the terminal device. The virtual user identification data acquiring request carries service selection information of virtual user identification data that needs to be acquired. A processing unit 83 is configured to determine, according to the service selection information, subscription relationship data of virtual user identification data matching the service selection information. A sending unit 84 is configured to send the subscription relationship data to the terminal device based on the near field communication protocol.

Further, in a possible implementation manner, the virtual user identification data stored in the storing unit 81 specifically includes: a correspondence between a classification identifier and the service selection information; and the processing unit 83 is further configured to search, according to the correspondence between the classification identifier and the service selection information, for a classification identifier corresponding to the service selection information.

Specifically, referring to Table 1, after the receiving unit 82 receives virtual user identification data request data sent by the terminal device, the processing unit 83 may search, according to an operator, a tariff, a service area, or the like included in the received service selection information, for a classification identifier of the matched virtual user identification data in the virtual user identification data product table shown in Table 1, where the classification identifier may be classified according to the operator, the tariff, and a communications network rate, and may also be classified in another manner.

Further, in a possible implementation manner, the virtual user identification data stored by the storing unit 81 may specifically further include: a correspondence between the classification identifier and an available number segment; and the processing unit 83 is further configured to search, according to the correspondence between the classification identifier and the available number segment, for an available number segment corresponding to the classification identifier, and acquire, according to the available number segment, subscription relationship data of virtual user identification data matching a distributed number.

Specifically, after finding a matched classification identifier, the processing unit 83 searches, according to the acquired classification identifier, a correspondence table between the classification identifier and the available distributed number shown in Table 2, for matching information, for example, an available number segment, then selects matched available information, for example, an available virtual user identification data number, and acquires subscription relationship data corresponding to the available number. The subscription relationship data of the virtual user identification data may be data encrypted by using a digital certificate, or the like, and may uniquely represent a subscription relationship between a user and a service provider. The virtual user identification data number may be similar to a phone number in Table 2, and may also be in another representation form. Finally, the processing unit 83 submits the subscription relationship data to the sending unit 84, and the sending unit 84 sends the subscription relationship data to the terminal device by using the near field communication protocol.

Further, in a possible implementation manner, the virtual user identification data stored by the storing unit 81 specifically further includes: a correspondence among the classification identifier, feature information, a management program, and a driver, referring to Table 3; the virtual user identification data acquiring request further includes feature information of the terminal device; the processing unit 83 is further configured to determine, according to the classification identifier and the feature information of the terminal device, a management program and a driver of virtual user identification data that match software and hardware systems supported by the terminal device; and the sending unit 84 is further configured to send, based on the near field communication protocol, the management program and the driver of the virtual user identification data to the terminal device.

Further, in a possible implementation manner, the processing unit 83 is further configured to update locally stored virtual user identification data according to a distribution result, that is, delete subscription relationship data of virtual user identification data that has already been distributed, from the locally stored virtual user identification data, or update a state of subscription relationship data of virtual user identification data that has already been distributed, referring to Table 4 and Table 5.

Further, in a possible implementation manner, the processing unit is further configured to report a distribution result to a virtual user identification data server, so that the virtual user identification data server modifies a state of virtual user identification data that has already been distributed, so as to prepare for provision of an operation service.

Still further, in a possible implementation manner, the storing unit 81 includes: a secure storage area configured with access rights, used to store subscription relationship data of the virtual user identification data.

In the distribution device provided by this embodiment, a sending unit can send subscription relationship data that is of virtual user identification data and determined by a processing unit to a target terminal device based on a near field communication protocol, so that the terminal device can also acquire subscription relationship data of required virtual user identification data without support of a communications network, and then the terminal device activates the subscription relationship data of the virtual user identification data, so as to achieve a purpose of accessing an operator network.

Embodiment 9

Figure 9:
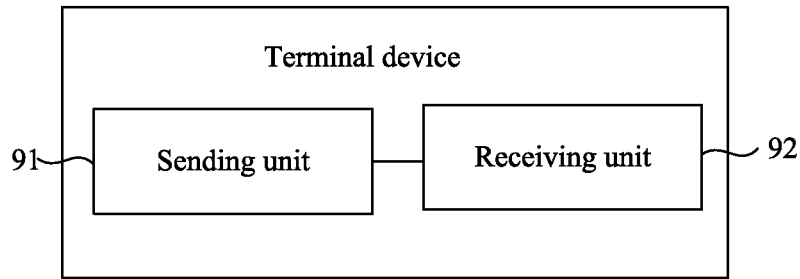
FIG. 9 is a structural block diagram of a terminal device according to Embodiment 9 of the present invention.

FIG. 9 is a structural block diagram of a terminal device according to Embodiment 9 of the present invention. As shown in FIG. 9, the terminal device may include a number of units. A sending unit 91 is configured to send a virtual user identification data acquiring request to the distribution device based on a near field communication protocol. The virtual user identification data acquiring request carries service selection information of virtual user identification data that needs to be acquired. A receiving unit 92 is configured to receive subscription relationship data that is of virtual user identification data matching the service selection information and returned by the distribution device based on the near field communication protocol.

Specifically, a distribution device stores virtual user identification data, and the distribution device is connected to a terminal device by using a near field communication protocol; when the terminal device needs to download the subscription relationship data of the virtual user identification data, the terminal device first establishes a near field communication with the distribution device by using a near field communication protocol, such as Bluetooth, WiFi, WiFi-Direct, or NFC; then, the sending unit 91 sends a required virtual user identification data acquiring request of the terminal device, where the virtual user identification data acquiring request carries service selection information of virtual user identification data that the terminal device expects to acquire; and after the distribution device determines subscription relationship data of virtual user identification data matching the service selection information, the receiving unit 92 receives the subscription relationship data of the matched virtual user identification data. For a specific method for determining the service selection information and the subscription relationship data of the virtual user identification data, reference may be made to the related descriptions in the foregoing embodiment of the method for distributing virtual user identification data.

In the terminal device for acquiring virtual user identification data provided by the embodiment of the present invention, a receiving unit can acquire subscription relationship data of required virtual user identification data from a distribution device based on a near field communication protocol, so that the terminal device can also acquire subscription relationship data of required virtual user identification data without support of a communications network, and then the terminal device activates the subscription relationship data of the virtual user identification data, so as to achieve a purpose of accessing an operator network.

Embodiment 10

Figure 10:
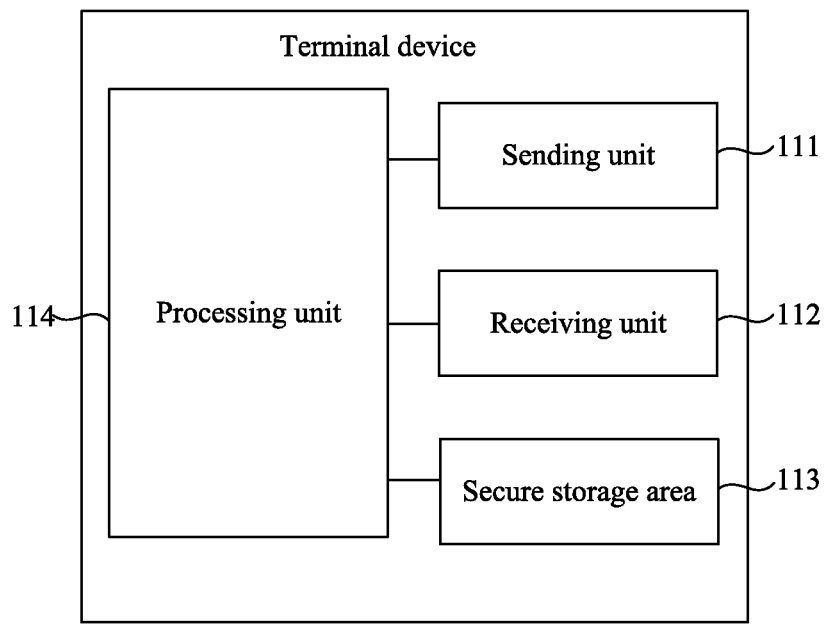
FIG. 10 is a structural block diagram of a terminal device according to Embodiment 10 of the present invention.

FIG. 10 is a structural block diagram of a terminal device according to Embodiment 10 of the present invention. As shown in FIG. 10, the terminal device may include a number of units. A sending unit 111 is configured to send a virtual user identification data acquiring request to the distribution device based on a near field communication protocol, where the virtual user identification data acquiring request carries service selection information of virtual user identification data that needs to be acquired. A receiving unit 112 is configured to receive subscription relationship data that is of virtual user identification data matching the service selection information and returned by the distribution device based on the near field communication protocol.

The virtual user identification data acquiring request sent by the sending unit 111 of the terminal device may further carry feature information of the terminal device; and the receiving unit 112 may be further configured to receive, based on the near field communication protocol, a management program and a driver that are sent by the distribution device, where the management program and the driver match software and hardware systems supported by the feature information of the terminal device.

Specifically, the management program and the driver of virtual user identification data may be installed in advance, so that the virtual user identification data acquiring request may not carry the feature information of the terminal device. If the management program and the driver of virtual user identification data are not installed in advance, the management program and the driver of the virtual user identification data may be acquired from the distribution device.

Further, in a possible implementation manner, the terminal device further includes: a secure storage area 113, where the secure storage area is configured with access rights and used to store the received subscription relationship data of the virtual user identification data; and a processing unit 114, configured to execute the management program and the driver, and import the subscription relationship data of the virtual user identification data into the secure storage area in the terminal device.

In the terminal device provided by this embodiment, a receiving unit may acquire subscription relationship data of required virtual user identification data from a distribution device based on a near field communication protocol, so that the terminal device can also acquire subscription relationship data of required virtual user identification data without support of a communications network, and then the terminal device activates the subscription relationship data of the virtual user identification data, so as to achieve a purpose of accessing an operator network.

Embodiment 11

Figure 11:
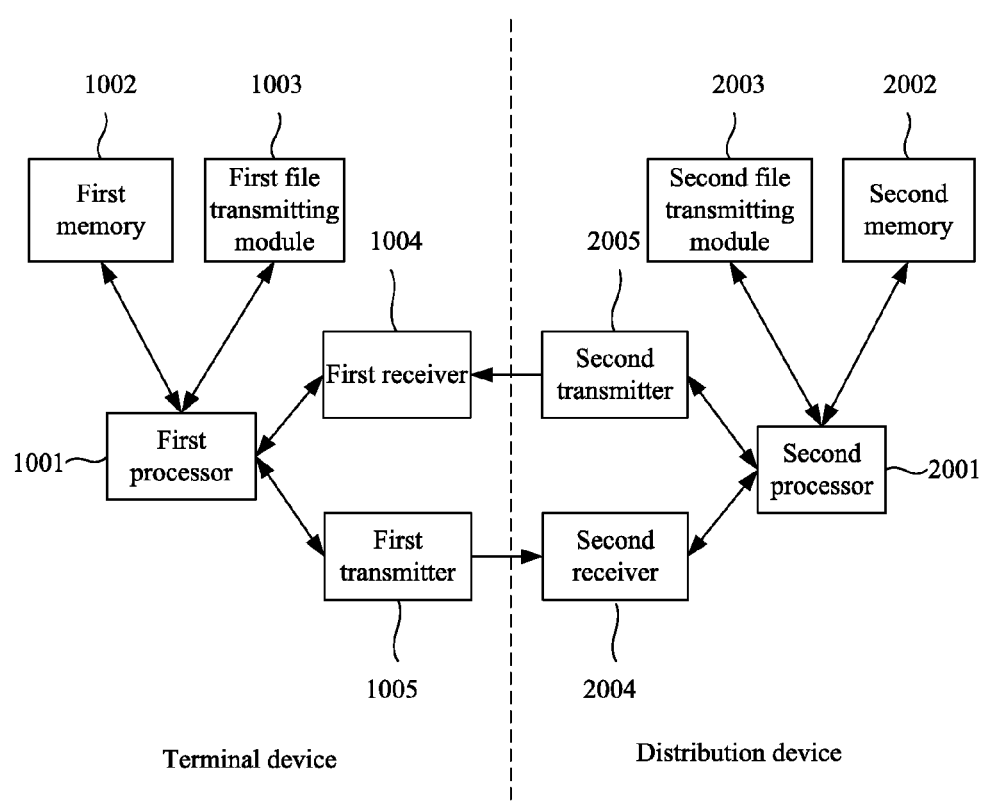
FIG. 11 is a schematic diagram of an application scenario of a distribution device and a terminal device according to Embodiment 11 of the present invention.

FIG. 11 is a schematic diagram of an application scenario of a distribution device and a terminal device according to Embodiment 11 of the present invention. As shown in FIG. 11, a processing unit of a distribution device may be implemented by using a processor and a file transmitting module; a sending unit and a receiving unit may be set in a near field communication module, and a secure storage area may be set in a storing module. A processing unit of a terminal device may be implemented by using a processor and a file transmitting module; a sending unit and a receiving unit may be set in a near field communication module, and a secure storage area may be set in a storing module.

The terminal device may include the following modules: a first processor 1001, configured to control running of a first memory 1002, a first file transmitting module 1003, a first receiver 1004, a first transmitter 1005, and a management program and a driver of virtual user identification data in the terminal device. The function of the processing unit 114 in the foregoing terminal device embodiment may be implemented by using the first processor 1001.

The first memory 1002 is configured to store a management program and a driver of received virtual user identification data, where a secure storage area 113 is set and may store subscription relationship data of virtual user identification data.

The first file transmitting module 1003 receives subscription relationship data from the distribution device by using the first receiver 1004, or receives a management program and a driver of virtual user identification data, so as to implement file transmission with the distribution device.

The first receiver 1004 can support one or more protocols of Bluetooth, WiFi, WiFi-Direct, and NFC. The function of the receiving unit 112 in the foregoing terminal device embodiment may be implemented by using the first receiver 1004.

The first transmitter 1005 can support one or more protocols of Bluetooth, WiFi, WiFi-Direct, and NFC. The function of the sending unit 111 in the foregoing terminal device embodiment may be implemented by using the first transmitter 1005.

The distribution device may include the following modules: a second processor 2001, configured to control running of a second memory 2002, a second file transmitting module 2003, a second receiver 2004, delivered subscription relationship data of virtual user identification data, and a management program and a driver in the distribution device; and the function of the processing unit 73 of the distribution device may be implemented by using the second processor 2001.

The second memory 2002 is configured to store a management program, a driver, and subscription relationship data of virtual user identification data to be sent. The storing unit 71 of the distribution device may be set in the storing module 2002, and that whether a secure storage area in the second module 2002 is used to store the subscription relationship data of the virtual user identification data is optional.

The second file transmitting module 2003 is configured to acquire, from the second memory 2002, subscription relationship data that needs to be sent, or acquire a management program and a driver of the virtual user identification data simultaneously, and send, through a second transmitter 2005, the acquired subscription relationship data or acquired management program and driver of the virtual user identification data to the terminal device, so as to implement file transmission with the terminal device.

The second receiver 2004 can support one or more protocols of Bluetooth, WiFi, WiFi-Direct, and NFC. The function of the receiving unit 72 in the foregoing distribution device embodiment may be implemented by using the second receiver 2004.

The second transmitter 2005 can support one or more protocols of Bluetooth, WiFi, WiFi-Direct, and NFC. The function of the sending unit 74 in the foregoing terminal device embodiment may be implemented by using the second transmitter 2005.

In the distribution device provided by this embodiment, subscription relationship data of virtual user identification data can be distributed to a target terminal device based on a near field communication protocol, so that the terminal device can also acquire subscription relationship data of required virtual user identification data without support of a communications network, and then the terminal device activates the subscription relationship data of the virtual user identification data, so as to achieve a purpose of accessing an operator network.

A person of ordinary skill in the art may be aware that, exemplary units and algorithm steps in the embodiments described in this specification can be implemented by electronic hardware or a combination of computer software and electronic hardware. Whether the functions are implemented by hardware or software depends on particular applications and design constraint conditions of the technical solutions. A person skilled in the art may select different methods to implement the described functions for a particular application, but it should not be considered that the implementation goes beyond the scope of the present invention.

If the functions are implemented in the form of computer software and are sold or used as an independent product, it may be considered, to a certain degree, that all or a part (for example, parts contributing to the prior art) of the technical solutions of the present invention are embodied in the form of a computer software product. The computer software product is generally stored in a computer readable storage medium and includes several instructions for instructing a computer device (which may be a personal computer, a server, a network device, or the like) to perform all or a part of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for distributing virtual user identification data, wherein a distribution device stores virtual user identification data and the distribution device is connected to a terminal device by using a near field communication protocol, the method comprising:
   receiving a virtual user identification data acquiring request sent by the terminal device, wherein the virtual user identification data acquiring request is received based on the near field communication protocol and carries service selection information of virtual user identification data that needs to be acquired;
   determining, according to the service selection information, subscription relationship data of virtual user identification data matching the service selection information; and
   sending, by the distribution device, the subscription relationship data to the terminal device based on the near field communication protocol.

2. The method for distributing virtual user identification data according to claim 1, wherein storing the virtual user identification data specifically comprises storing, by the distribution device, a correspondence between a classification identifier and the service selection information; and
   wherein determining the subscription relationship data of virtual user identification data matching the service selection information specifically comprises searching, by the distribution device, according to the correspondence between the classification identifier and the service selection information, for a classification identifier corresponding to the service selection information.

3. The method for distributing virtual user identification data according to claim 2, wherein storing the virtual user identification data comprises storing, by the distribution device, a correspondence between the classification identifier and an available number segment; and
   wherein determining the subscription relationship data of virtual user identification data matching the service selection information specifically further comprises: searching, by the distribution device, according to the correspondence between the classification identifier and the available number segment, for an available number segment corresponding to the classification identifier, and acquiring, according to the available number segment, subscription relationship data of virtual user identification data matching a distributed number.

4. The method for distributing virtual user identification data according to claim 2, wherein storing the virtual user identification data specifically further comprises storing, by the distribution device, a correspondence among the classification identifier, feature information, a management program, and a driver;
wherein the virtual user identification data acquiring request further comprises feature information of the terminal device; and
wherein the method further comprises determining, by the distribution device and according to the classification identifier and the feature information of the terminal device, a management program and a driver of the virtual user identification data that match software and hardware systems supported by the terminal device, and sending, by the distribution device, the management program and the driver of the virtual user identification data to the terminal device based on the near field communication protocol.

5. The method for distributing virtual user identification data according to claim 1, further comprising updating locally stored virtual user identification data according to a distribution result.

6. The method for distributing virtual user identification data according to claim 1, further comprising storing the subscription relationship data in a secure storage area configured with access rights in the distribution device.

7. A method for acquiring virtual user identification data, wherein a distribution device stores virtual user identification data and the distribution device is connected to a terminal device by using a near field communication protocol, the method comprising:
sending, by the terminal device, a virtual user identification data acquiring request to the distribution device, wherein the virtual user identification data acquiring request is sent based on the near field communication protocol and carries service selection information of virtual user identification data that needs to be acquired; and
receiving subscription relationship data that is of virtual user identification data matching the service selection information and returned by the distribution device based on the near field communication protocol.

8. The method for acquiring virtual user identification data according to claim 7, wherein the virtual user identification data acquiring request further comprises feature information of the terminal device, and the method further comprising:
receiving, by the terminal device, based on the near field communication protocol, a management program and a driver that are sent by the distribution device, wherein the management program and the driver match software and hardware systems supported by the feature information of the terminal device.

9. The method for acquiring virtual user identification data according to claim 8, further comprising executing the management program and the driver, and importing the subscription relationship data of the virtual user identification data into a secure storage area configured with access rights in the terminal device.

10. A distribution device, wherein the distribution device is connected to a terminal device by using a near field communication protocol, the distribution device comprising:
a memory, configured to store virtual user identification data;
a receiver, configured to receive, based on the near field communication protocol, a virtual user identification data acquiring request sent by the terminal device, wherein the virtual user identification data acquiring request carries service selection information of virtual user identification data that needs to be acquired;
a processor, configured to determine, according to the service selection information, subscription relationship data of virtual user identification data matching the service selection information; and
a transmitter, configured to send the subscription relationship data to the terminal device based on the near field communication protocol.

11. The distribution device according to claim 10, wherein:
the virtual user identification data stored by the memory comprises a correspondence between a classification identifier and the service selection information; and
the processor is further configured to search, according to the correspondence between the classification identifier and the service selection information, for a classification identifier corresponding to the service selection information.

12. The distribution device according to claim 11, wherein:
the virtual user identification data stored by the memory further comprises a correspondence between the classification identifier and an available number segment; and
the processor is further configured to search, according to the correspondence between the classification identifier and the available number segment, for an available number segment corresponding to the classification identifier, and to acquire, according to the available number segment, subscription relationship data of virtual user identification data matching a distributed number.

13. The distribution device according to claim 11, wherein the virtual user identification data stored by the memory further comprises a correspondence among the classification identifier, feature information, a management program, and a driver;
wherein the virtual user identification data acquiring request further comprises feature information of the terminal device;
wherein the processor is further configured to determine, according to the classification identifier and the feature information of the terminal device, a management program and a driver of the virtual user identification data that match software and hardware systems supported by the terminal device; and
wherein the transmitter is further configured to send the management program and the driver of the virtual user identification data to the terminal device based on the near field communication protocol.

14. The distribution device according to claim 10, wherein the processor is further configured to update locally stored virtual user identification data according to a distribution result.

15. The distribution device according to claim 10, wherein the memory comprises a secure storage area configured with access rights, used to store the subscription relationship data of the virtual user identification data.

16. A terminal device, wherein a distribution device stores virtual user identification data and the distribution device is connected to a terminal device by using a near field communication protocol, the terminal device comprising:
- a transmitter, configured to send, based on the near field communication protocol, a virtual user identification data acquiring request to the distribution device, wherein the virtual user identification data acquiring request carries service selection information of virtual user identification data that needs to be acquired; and
- a receiver, configured to receive subscription relationship data that is of virtual user identification data matching the service selection information and returned by the distribution device based on the near field communication protocol.

17. The terminal device according to claim 16, wherein the virtual user identification data acquiring request further comprises feature information of the terminal device; and
- wherein the transmitter is further configured to receive, based on the near field communication protocol, a management program and a driver that are sent by the distribution device, wherein the management program and the driver match software and hardware systems supported by the feature information of the terminal device.

18. The terminal device according to claim 17, wherein the terminal device further comprises a processor, configured to execute the management program and the driver and to import the subscription relationship data of the virtual user identification data into a secure storage area configured with access rights in the terminal device.

19. A terminal, wherein the terminal is connected to a distribution device by using a near field communication protocol, the distribution device storing virtual user identification data, the terminal comprising:
- a transmitter, configured to send, based on the near field communication protocol, a virtual user identification data acquiring request to the distribution device, wherein the virtual user identification data acquiring request carries service selection information of virtual user identification data that needs to be acquired;
- a receiver, configured to receive subscription relationship data that is of virtual user identification data matching the service selection information and returned by the distribution device based on the near field communication protocol; and
- a processor, configured to control the receiver, the transmitter, and running of a management program and a driver of the virtual user identification data.

20. The terminal according to claim 19, wherein the terminal further comprises a memory that stores a management program and a driver of the received virtual user identification data and the subscription relationship data of the virtual user identification data.

* * * * *